Oct. 13, 1959 W. G. WHITE 2,908,509
DROP STAKE BUNKS FOR TRUCKS
Filed March 27, 1957 2 Sheets-Sheet 2

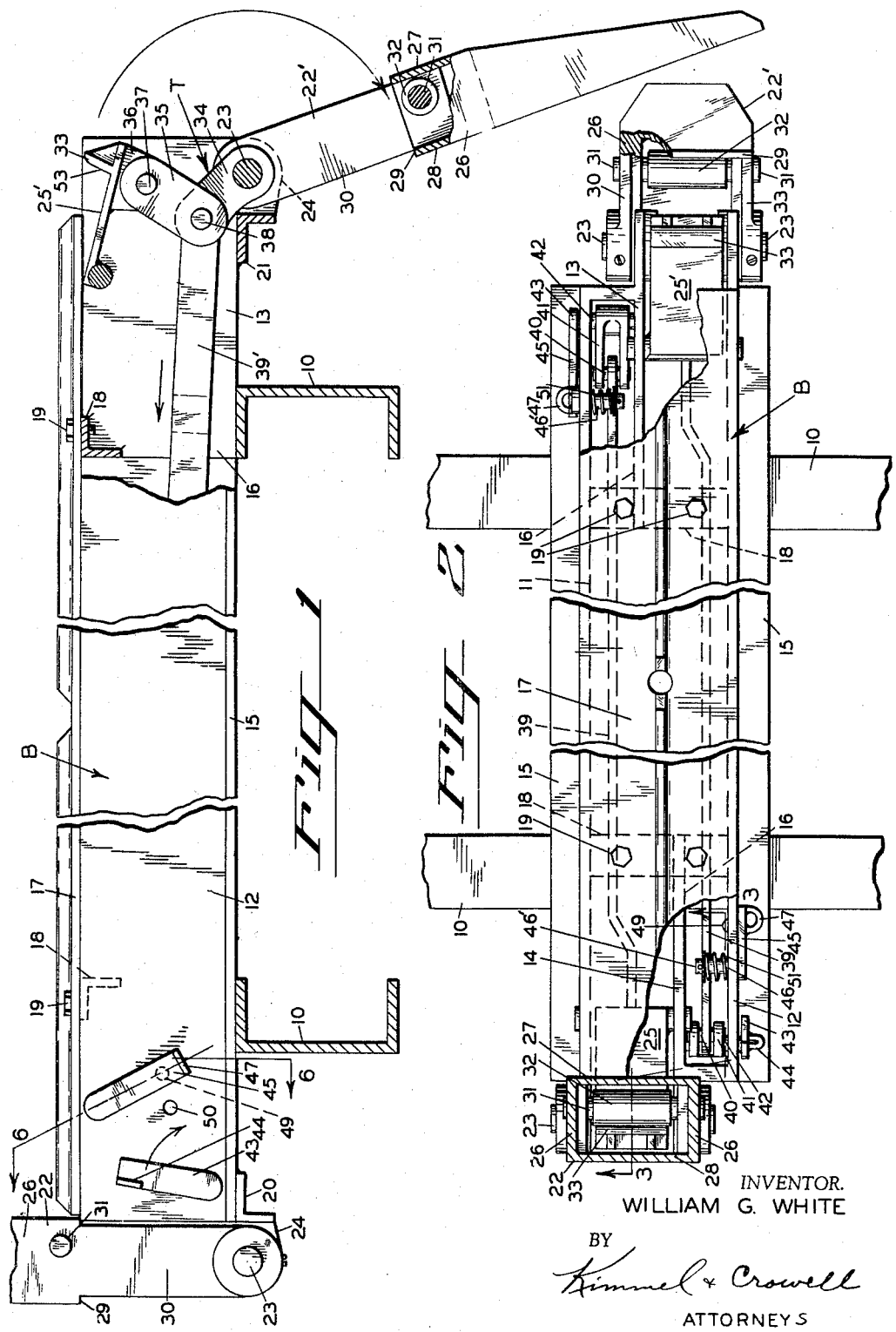

INVENTOR.
WILLIAM G. WHITE
BY
Kimmel & Crowell
ATTORNEYS

United States Patent Office 2,908,509
Patented Oct. 13, 1959

2,908,509

DROP STAKE BUNKS FOR TRUCKS

William G. White, Aberdeen, Wash.

Application March 27, 1957, Serial No. 648,944

4 Claims. (Cl. 280—145)

The present invention relates to drop stake bunks for trucks, and particularly drop stakes for logging trucks and trailers.

The primary object of the invention is to provide a drop stake incorporating a simple locking device for holding the stakes in vertical or load carrying position and for releasing them for unloading loads from the bunks.

One of the objects of the invention is to provide a locking means for drop stakes that has great strength, but requires very little effort to unlock with the stake under loaded conditions.

Another object of the invention is to provide a drop stake having a locking device that will release the stake before bending or breaking of the stake occurs under heavy shocks.

Other objects and advantages will become apparent in the following specification when considered in the light of the attached drawings, in which:

Figure 1 is a fragmentary side view of the invention, showing one stake in carrying position and the opposite stake in dropped or released position, parts broken away for convenience of illustration.

Figure 2 is a fragmentary plan view with parts broken away for convenience of illustration.

Figure 5:
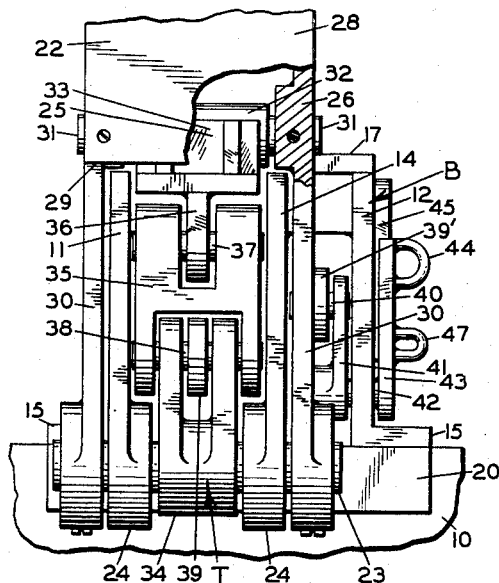
Figure 5 is a fragmentary end view looking to the right of Figure 1, parts broken away for convenience of illustration.

Referring now to the drawings in detail wherein like reference numerals indicate like parts throughout the several figures, the reference character B indicates generally my new and improved drop stake logging bunk, which is shown mounted upon a frame 10 of a truck or trailer. The bunk B consists of parallel side frames 11 and 12, having relatively short intermediate and parallel frame members 13 and 14 disposed therebetween. The side members 11 and 12 each have angles 15, secured by welding, to the truck frame 10, as best illustrated in Figures 1 and 2.

The inner ends 16 of the intermediate frames 13 and 14 are also secured to the frame members 10. A top cover plate 17 is fixedly secured to a transverse bar 18 extending between and welded to the side frames 11 and 12 by bolts 19.

One of the outer ends of the frame 11, that shown on the left as viewing Figures 1 and 2, is secured to the outer end of the intermediate member 14 by the angle plate 20. The outer end of the frame 12, as viewed to the right of Figures 1 and 2, is secured to the frame 13 by the angle bar 21. This structure provides a rigid bunk frame.

Figure 3:
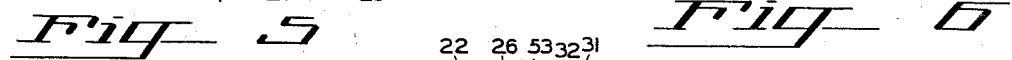
Figure 3 is an enlarged fragmentary sectional view, taken on the line 3—3 of Figure 2, looking in the direction indicated.

Drop stakes 22 and 22' each have one of their ends pivotally connected to the respective cross shafts 23, which pass through the bearings 24 forming part of the ends of the frame members 11, 12, 13 and 14. Latches 25 and 25' are pivotally journalled between the frame members 11 and 12, and the intermediate frames 13 and 14. Referring to Figure 3, the latch 25 is shown in position for holding the stake 22 in a vertical position.

The stakes 22 and 22' are preferably made of box-like construction having opposite side members 26 bound together by the front and rear walls 27 and 28. The side members 26 extend from the lower edges 29 of the front and rear walls 27 and 28 into bifurcated extensions 30, which are pivotally mounted to the bunk B by the cross shafts 23 as above described. Extending transversely of the stake 22 at a point somewhat above the lower edges 29 of the front and rear walls 27 and 28 in a cross pin 31. A roller 32 is journalled to the pin 31. The dog 33 of the latches 25 and 25' engages the roller 32 on the cross pin 31, holding the stakes 22 and 22' in a vertical position.

The latches 25 and 25' are moved into and out of locking position by the toggle system T. The toggle system T includes a link 34, pivotally mounted to the cross pin 23 and a link 35 pivotally connected to the ear 36 of the latches 25 and 25' by a pin 37.

The links 34 and 35 are pivotally connected together by a cross pin 38. Operating bars 39 also each have one end pivotally connected to the cross pins 37, and extend through the bunk B to the opposite ends of the bunk B and are pivotally connected at 40 to the manually operated levers 41.

The levers 41 are fixedly keyed to the shaft 42 journalled within the intermediate members 13 and 14 and through the outer frame members 11 and 12 of the bunk B. Keyed to the shaft 42 is a lever 43 located on the outside of the bunk B, referring particularly to Figures 2 and 4. The lever 43 has an ear 44 formed on its outer end at right angles thereto with a hole passing therethrough. A second lever 45 is pivotally mounted at 46 by a shaft 46' to the outside of the bunk B. The lever 45 also has a foot or ear 47 formed on its oppositely disposed end adjacent to the ears 44 of the lever 43. The ears 47 each have a hole passing therethrough.

Figure 4:
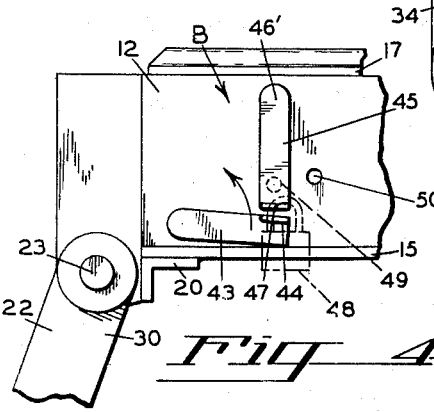
Figure 4 is a fragmentary side elevation.

When the levers 43 and 45 are in the position shown in Figure 4, a padlock 48 is applied thereto through the holes provided in the ears 44 and 47. The object of the lever 45 is to hold the lever 43 in its down position. When in this position, the bar 39 is held in the position shown in Figure 3, holding the toggle system T in alignment, securing the latch 25 in its holding position for maintaining the stake 22 in a vertical load carrying position.

Referring to Figures 1 and 2, when the lever 43 is moved to the position shown, it will move the bar 39' in the direction of the arrows, buckling the toggle system T to the position shown, unlatching the dog 33 from the cross pin 31 and roller 32 of the stake 22', allowing the stake 22' to drop down in the direction of the arrow. When the stake 22' is raised again to a vertical position, the lever 43 is moved in the direction of the arrow, which will straighten the toggle system T to the position best shown in Figures 2 and 3, bringing the dog 33 behind the cross pin 31 of the stake 22' holding the stake 22' in the vertical position for carrying the load.

As the lever 43 is brought to the position shown in Figure 4, the lever 45 will be moved in alignment with the free end of the lever 43, preventing the releasing movement of the lever 43. To further insure its safety, the lock 48 can be applied to the ears 44 and 47 of the levers 43 and 45.

Figure 6:
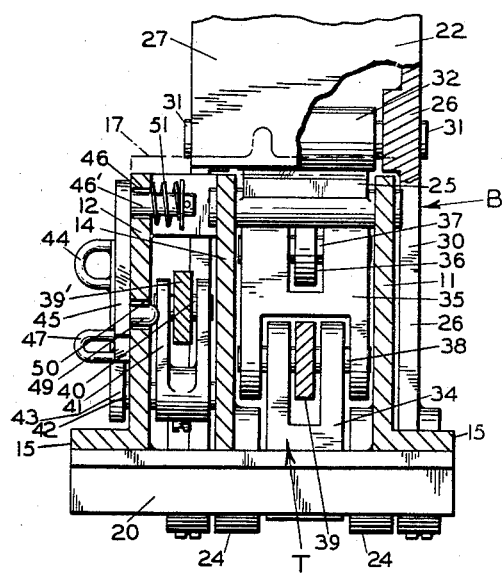
Figure 6 is a fragmentary end sectional view, taken on the line 6—6 of Figure 1, parts broken away for convenience of illustration.

In the event that a log is dropped against the stake 22 in its vertical position, the cross pin 31 is made of such a strength that the pin 31 will be sheared before the stake 22 itself is damaged. The locking lever 45, referring to Figure 6, has a locking pin 49 extending rearwardly therefrom to engage the hole 50 within the side of the bunk B, holding the lever 45 in a fixed locked position.

A spring 51 is applied to the pivot bolt 46' tending to hold the locking pin 49 within the hole 50, until forcibly pulled therefrom in the operation of unlocking the lever 43, permitting the same to be moved in the direction of the arrow, Figure 4.

In unlocking the stake 22 and dropping the same, little effort is required due to the fact that there is a slight incline 53 formed on the face of the dog 33, tending to force the dog 33 away from the pin 31 by the pressure exerted against the stake 22 by the load. With this structure, it requires little or no pressure to unlock the latch 25.

In the operation of the bunk B, the stake 22 can be brought to a vertical position where it will remain until the operator moves the lever 43 from the opposite side of the bunk B to the position shown in Figure 4, which will bring the toggle system T to an in-line position, thereby raising the locking latch 25 to its locking and holding position.

Then by bringing the locking lever 45 to a vertical position, dropping the locking pin 49 into the hole 50 on the side of the bunk B, the lever 43 will be locked down, and to further insure safety, the padlock 48 may be inserted within the ears 44 and 47.

To drop the stakes 22, 22', the operator moves the locking lever 45 out of locking position by withdrawing the locking pin 49 from the hole 50, allowing the lever 43 to be moved in the direction of the arrows, forcing the bar 39 toward the toggle system T, buckling the same as indicated on the right hand side of Figures 1 and 2.

Having thus described the preferred embodiment of the invention, it should be understood that numerous structural modifications and adaptations may be resorted to without departing from the scope of the appended claims.

What is claimed is:

1. A drop stake bunk for trucks comprising an elongated bunk frame extending transversely of a truck frame and secured thereto, a drop stake positioned at each end of said bunk frame, means pivotally securing each of said drop stakes at their lower ends to the lower outer end portions of said bunk frame, a latch pivotally secured to said bunk frame adjacent each of said drop stakes, a roller member journalled on each of said drop stakes engageable by said latch for detachably securing said drop stakes in upright position on said bunk frame, a link pivotally secured to said bunk frame by the means pivotally securing said drop stakes thereto, a second link, means pivotally securing one end of said second link to said first link, means at the opposite end of said second link pivotally connecting said second link to the end of said latch opposite the pivot thereof, and a hand controlled operating bar secured to said means pivotally connecting said first and second links for swinging said links to positively pivot said latch into and out of roller engaging position releasably locking said stake in upright position.

2. A device as claimed in claim 1 wherein said first and second links are arranged in aligned relation when holding said latch in roller engaging position.

3. A device as claimed in claim 1 wherein locking means are provided on said bunk for engagement with said hand operated bar for locking said bar in latch engaged position.

4. A device as claimed in claim 1 wherein said hand operated bar terminates in a handle positioned at the end of said bunk frame opposite the drop stake with which it is associated.

References Cited in the file of this patent

UNITED STATES PATENTS

| | | |
|---|---|---|
| 403,898 | Thompson | May 21, 1889 |
| 913,925 | Strathy | Mar. 2, 1909 |
| 1,256,860 | Yerk | Feb. 19, 1918 |
| 2,210,614 | Boyer | Aug. 6, 1940 |
| 2,469,760 | Berry | May 10, 1949 |
| 2,788,225 | Caton | Apr. 9, 1957 |
| 2,828,140 | Hassell | Mar. 25, 1958 |

FOREIGN PATENTS

| | | |
|---|---|---|
| 15,677 | Netherlands | Dec. 15, 1926 |